US007182314B2

(12) United States Patent
Harvey et al.

(10) Patent No.: US 7,182,314 B2
(45) Date of Patent: Feb. 27, 2007

(54) APPARATUS FOR ACTUATING A VALVE

(75) Inventors: Raymond Harvey, Newbury (GB); Carroll Stein, S. Beloit, IL (US)

(73) Assignee: Mastergear USA, South Beloit, IL (US)

( * ) Notice: Subject to any disclaimer, the term of this patent is extended or adjusted under 35 U.S.C. 154(b) by 40 days.

(21) Appl. No.: 11/069,824

(22) Filed: Feb. 28, 2005

(65) Prior Publication Data

US 2006/0192162 A1 Aug. 31, 2006

(51) Int. Cl.
*F16K 31/02* (2006.01)

(52) U.S. Cl. ............... 251/249.5; 251/305; 251/129.11

(58) Field of Classification Search .............. 251/249.5
See application file for complete search history.

(56) References Cited

U.S. PATENT DOCUMENTS 3,889,924 A * 6/1975 Karpenko ................ 251/249.5
4,220,053 A * 9/1980 Barlow et al. ................ 74/425
4,220,270 A * 9/1980 Szadkowski ................ 222/600
4,533,114 A * 8/1985 Cory et al. ................... 251/67
5,233,879 A 8/1993 Watanuki et al.
5,758,542 A 6/1998 Kim et al.
5,791,191 A 8/1998 Wittenstein et al.
5,839,320 A 11/1998 Komachi
5,855,140 A 1/1999 Imamura
6,129,337 A 10/2000 Wu
6,276,664 B1 * 8/2001 Keller ................... 251/129.12
6,591,707 B2 7/2003 Torii et al.
6,766,709 B1 * 7/2004 West et al. ................... 74/425
2005/0012064 A1 * 1/2005 Lay ......................... 251/249.5

FOREIGN PATENT DOCUMENTS

GB 2282654 12/1995

* cited by examiner

*Primary Examiner*—J. Casimer Jacyna
(74) *Attorney, Agent, or Firm*—David J. Archer

(57) ABSTRACT

An apparatus for actuating a valve includes a rotatable control shaft connected to the valve and a gearbox wheel is secured to the control shaft. A worm intermeshes with the gearteeth of the gearbox wheel such that when the worm is rotated, the wheel and the shaft are rotated for moving the valve between the open and the closed disposition thereof. A housing defines an enclosure for the reception therein of the gearbox wheel and the intermeshing worm. Bearings are slidably disposed within recesses so that location of the worm into intermeshing relationship with the gearteeth is facilitated. A multi-turn power drive is secured to the flange and is drivingly connected to the first extremity of the worm for rotating the worm so that the valve is controllably moved between the open and the closed disposition thereof.

15 Claims, 2 Drawing Sheets

APPARATUS FOR ACTUATING A VALVE

BACKGROUND OF THE INVENTION

1. Field of the Invention

The present invention relates to an apparatus for actuating a valve. More specifically, the present invention relates to an apparatus having a gearbox wheel and cooperating worm for actuating a valve.

2. Background Information

Valve actuators typically include a shaft for rotating a valve through 90 degrees for moving the valve between an open and a closed disposition. The shaft is secured to a quarter section gearwheel which is driven by a worm rotated by a hand wheel.

The worm is normally supported at both ends by bearings and the assembly of the worm into mesh with the driven gearwheel has often been a labor intensive operation. Also, particularly with larger valves, it is preferable for the worm to be driven by a multi-turn power drive for the remote control of the valve actuator.

The present invention provides a unique valve actuator which is easy to assemble and which is driven by a multi-turn power drive which is directly connected to a flange which is an integral part of a cover of a housing for the gearwheel and worm.

Therefore, a primary feature of the present invention is the provision of an apparatus for actuating a valve that overcomes the problems associated with the prior art arrangements.

Another feature of the present invention is the provision of an apparatus for actuating a valve that greatly simplifies the assembly of the apparatus.

A further feature of the present invention is the provision of an apparatus for actuating a valve that enables remote control of such valve actuator.

Other features and advantages of the present invention will be readily apparent to those skilled in the art by a consideration of the detailed description of a preferred embodiment of the present invention contained herein.

SUMMARY OF THE INVENTION.

An apparatus for actuating a valve is disclosed. The apparatus includes a rotatable control shaft which has a first and a second end, the first end of the control shaft being connected to the valve such that when the shaft is rotated, the valve is moved between an open and a closed disposition thereof. A gearbox wheel has a first and a second side, the wheel being secured to the second end of the control shaft such that when the gearbox wheel rotates about a rotational axis of the control shaft, the control shaft is rotated for moving the valve between the open and the closed disposition thereof. The gearbox wheel defines a plurality of gearteeth which are disposed around a portion of a periphery of the wheel. A worm has a first and a second extremity, the worm having an axis of rotation which is disposed angularly relative to the rotational axis of the control shaft. The worm intermeshes with the gearteeth of the gearbox wheel such that when the worm is rotated, the wheel and the shaft are rotated for moving the valve between the open and the closed disposition thereof. A housing defines an enclosure for the reception therein of the gearbox wheel and the intermeshing worm. A first bearing is provided for rotatably supporting the first extremity of the worm, the first bearing being slidably received within a first recess defined by the housing. A second bearing rotatably supports the second extremity of the worm, the second bearing being slidably received within a second recess defined by the housing. The bearings and the recesses are structured such that when the first and the second extremities of the worm extend respectively through the first and the second bearings, the bearings are slidably disposed respectively within the first and second recesses so that location of the worm into intermeshing relationship with the gearteeth is facilitated. A cover is secured to the housing for sealing the enclosure and for retaining the gearbox wheel and intermeshing worm within the enclosure. The cover defines a flange which extends radially from the axis of rotation of the worm so that the first extremity of the worm extends through the flange. A multi-turn power drive is secured to the flange and is drivingly connected to the first extremity of the worm for rotating the worm so that the valve is controllably moved between the open and the closed disposition thereof.

In a more specific embodiment of the present invention, the second end of the control shaft extends through the housing and the gearbox wheel, the control shaft being coaxial relative to the gearbox wheel, the second end of the control shaft defining an axial slot.

Furthermore, the gearbox wheel defines an elongate channel for the reception therein of the second end of the control shaft, the elongate channel having an axial groove.

Additionally, the gearbox wheel includes a key which cooperates with the axial slot of the control shaft and the axial groove of the elongate channel such that the gearbox wheel and the second end of the shaft are removably secured relative to each other so that rotation of the wheel about the rotational axis of the control shaft rotates the control shaft for moving the valve between the open and the closed disposition thereof.

Also, the gearbox wheel includes a sector having a first and a second termination, the sector extending radially from the rotational axis of the control shaft, the sector defining the portion of the periphery of the wheel such that the portion extends approximately through 90 degrees around the periphery of the wheel.

Moreover, the gearbox wheel includes an adjustable stop which extends through the housing, the stop reacting with the first termination of the sector for limiting rotation of the wheel within the housing.

Further, the sector defines the plurality of gearteeth, the gearteeth extending substantially coaxially relative to the rotational axis of the control shaft.

Also, the axis of rotation of the worm is disposed substantially normal to the rotational axis of the control shaft and the worm intermeshes with the gearteeth of the wheel between the first and second extremities of the worm.

More specifically, the worm defines a worm gear of generally spiral configuration such that when the worm gear intermeshes with the gearteeth of the wheel, rotation of the worm gear about the axis of rotation of the worm rotates the gearbox wheel about the rotational axis of the control shaft.

Preferably, the housing is a one piece casting, the housing defining a cavity for the rotatable reception therein of the first side of the gearbox wheel so that rotation of the gearbox wheel within the enclosure about the rotational axis of the shaft is permitted.

The first bearing encircles the first extremity of the worm, the first bearing defining an external shape which slidably cooperates with the first recess for permitting loading and unloading of the first bearing within the first recess in a first direction which is disposed parallel to the rotational axis of the control shaft;

Additionally, the second bearing encircles the second extremity of the worm, the second bearing defining an external configuration which slidably cooperates with the second recess for permitting loading and unloading of the second bearing within the second recess in a second direction which is disposed parallel to the rotational axis of the control shaft.

Also, the cover defines a further cavity for the rotatable reception therein of the second side of the gearbox wheel so that when the cover together with the worm rotatably supported by the bearings is aligned with the housing, the bearings slide within the respective recesses such that the second side of the gearbox wheel is received within the further cavity so that the cavities bearingly support the gearbox wheel for rotation thereof within the enclosure.

Moreover, the multi-turn power drive is an electric multi-turn power drive.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS.

Similar reference characters refer to similar parts throughout the various views of the drawings.

DETAILED DESCRIPTION OF THE DRAWINGS

Figure 1:
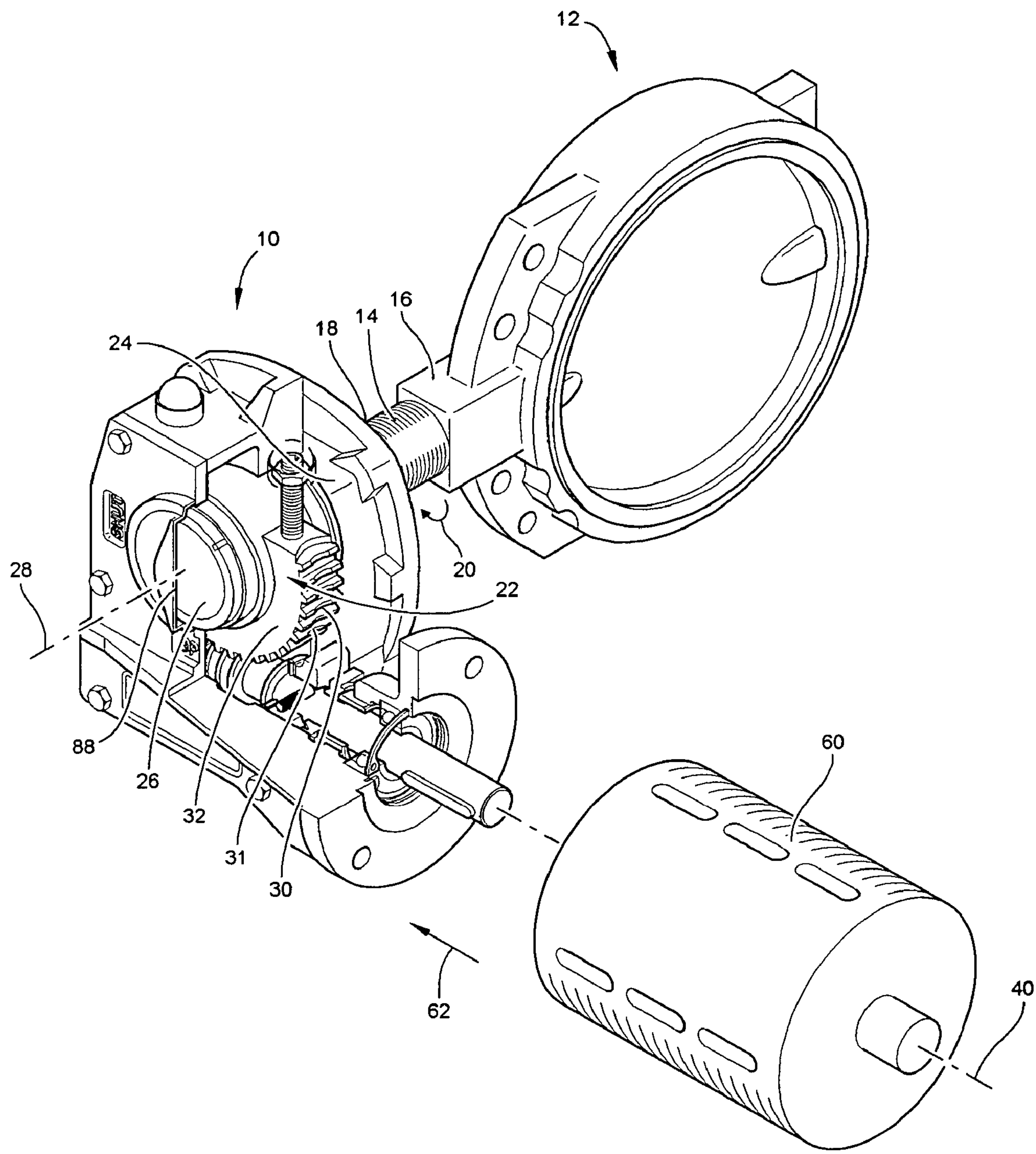
FIG. 1 is a perspective view of an apparatus according to the present invention for actuating a valve.

FIG. 1 is a perspective view of an apparatus generally designated 10 according to the present invention for actuating a valve generally designated 12. As shown in FIG. 1, the apparatus 10 includes a rotatable control shaft 14 which has a first and a second end 16 and 18 respectively. The first end 16 of the control shaft 14 is connected to the valve 12 such that when the shaft is rotated as indicated by the arrow 20, the valve 12 is moved between an open disposition as shown in FIG. 1 and a closed disposition thereof. A gearbox wheel generally designated 22 has a first and a second side 24 and 26 respectively, the wheel 22 being secured to the second end 18 of the control shaft 14 such that when the gearbox wheel 22 rotates about a rotational axis 28 of the control shaft 14, the control shaft 14 is rotated as shown by the arrow 20 for moving the valve 12 between the open and the closed disposition thereof. The gearbox wheel 22 defines a plurality of gearteeth 30 and 31 which are disposed around a portion 32 of a periphery of the wheel 22.

Figure 2:
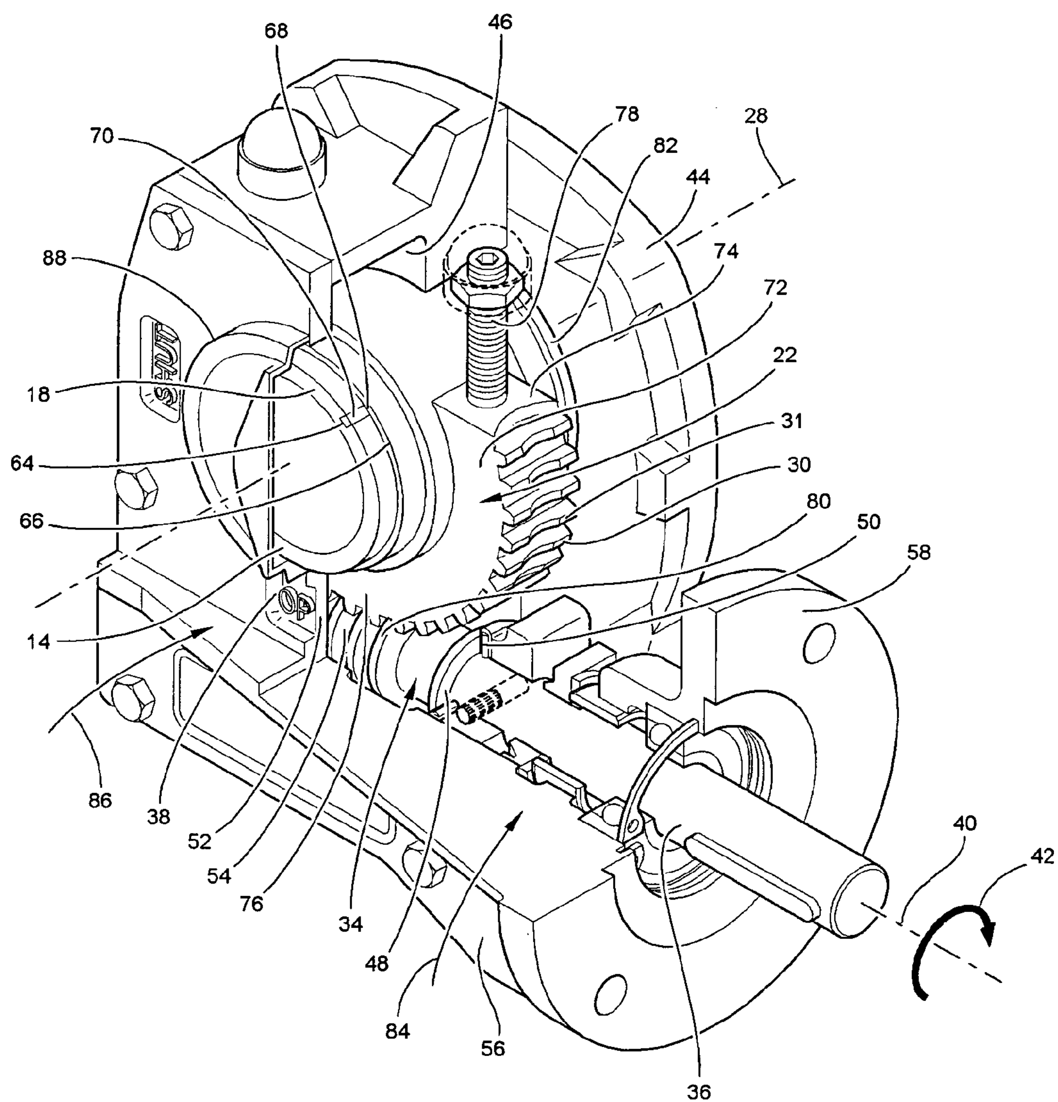
FIG. 2 is an enlarged view of the gearbox wheel shown in FIG. 1.

FIG. 2 is an enlarged view of the gearbox wheel 22 shown in FIG. 1. As shown in FIG. 2, a worm generally designated 34 has a first and a second extremity 36 and 38 respectively. The worm 34 has an axis of rotation 40 which as shown in FIG. 1, is disposed angularly relative to the rotational axis 28 of the control shaft 14. The worm 34 intermeshes with the gearteeth 30, 31 of the gearbox wheel 22 such that when the worm 34 is rotated as indicated by the arrow 42, the wheel 22 and the shaft 14 are rotated as indicated by the arrow 20 for moving the valve 12 between the open and the closed disposition thereof. A housing generally designated 44 defines an enclosure 46 for the reception therein of the gearbox wheel 22 and the intermeshing worm 34. A first bearing 48 is provided for rotatably supporting the first extremity 36 of the worm 34, the first bearing 48 being slidably received within a first recess 50 defined by the housing 44. A second bearing 52 rotatably supports the second extremity 38 of the worm 34, the second bearing 52 being slidably received within a second recess 54 defined by the housing 44. The bearings 48 and 52 and the recesses 50 and 54 respectively are structured such that when the first and the second extremities 36 and 38 of the worm 34 extend respectively through the first and the second bearings 48 and 52, the bearings 48 and 52 are slidably disposed respectively within the first and second recess 50 and 54 so that location of the worm 34 into intermeshing relationship with the gearteeth 30, 31 is facilitated. A cover 56 is secured to the housing 44 for sealing the enclosure 46 and for retaining the gearbox wheel 22 and intermeshing worm 34 within the enclosure 46. The cover 56 defines a flange 58 which extends radially from the axis of rotation 40 of the worm 34 so that the first extremity 36 of the worm 34 extends through the flange 58.

FIG. 1 shows a multi-turn power drive 60 which when moved towards the flange 58 as indicated by the arrow 62, is secured to the flange 58 and is drivingly connected to the first extremity 36 of the worm 34 for rotating the worm 34 as indicated by the arrow 42 so that the valve 12 is controllably moved between the open and the closed disposition thereof.

In a more specific embodiment of the present invention, the second end 18 of the control shaft 14 extends through the housing 44 and the gearbox wheel 22, the control shaft 14 being coaxial relative to the gearbox wheel 22, the second end 18 of the control shaft 14 defining an axial slot 64.

Furthermore, the gearbox wheel 22 defines an elongate channel 66 for the reception therein of the second end 18 of the control shaft 14, the elongate channel 66 having an axial groove 68.

Additionally, the gearbox wheel 22 includes a key 70 which cooperates with the axial slot 64 of the control shaft 14 and the axial groove 68 of the elongate channel 66 such that the gearbox wheel 22 and the second end 18 of the shaft 14 are removably secured relative to each other so that rotation of the wheel 22 about the rotational axis 28 of the control shaft 14, shown in FIG. 1, rotates the control shaft 14 as indicated by the arrow 20 for moving the valve 12 between the open and the closed disposition thereof.

Also, the gearbox wheel 22 includes a sector 72 having a first and a second termination 74 and 76 respectively, the sector 72 extending radially from the rotational axis 28 of the control shaft 14, the sector 72 defining the portion 32 as shown in FIG. 1, of the periphery of the wheel 22 such that the portion 32 extends approximately through 90 degrees around the periphery of the wheel 22.

Moreover, the gearbox wheel 22 includes an adjustable stop 78 which extends through the housing 44, the stop 78 reacting with the first termination 74 of the sector 72 for limiting rotation of the wheel 22 within the housing 44.

Further, the sector 72 defines the plurality of gearteeth 30, 31, the gearteeth 30, 31 extending substantially coaxially relative to the rotational axis 28 of the control shaft 14

Also, the axis of rotation 40 of the worm 34 is disposed substantially normal to the rotational axis 28 of the control shaft 14 and the worm 34 intermeshes with the gearteeth 30, 31 of the wheel 22 between the first and second extremities 36 and 38 of the worm 34.

More specifically, the worm 34 defines a worm gear 80 of generally spiral configuration such that when the worm gear

80 intermeshes with the gearteeth 30, 31 of the wheel 22, rotation of the worm gear 34 about the axis of rotation 40 of the worm 34 as indicated by the arrow 42 rotates the gearbox wheel 22 about the rotational axis 28 of the control shaft 14.

Preferably, the housing 44 is a one piece casting, the housing 44 defining a cavity 82 for the rotatable reception therein of the first side 24 of the gearbox wheel 22 so that rotation of the gearbox wheel 22 within the enclosure 46 about the rotational axis 28 of the shaft 14 is permitted.

The first bearing 48 encircles the first extremity 36 of the worm 34, the first bearing 48 defining an external shape which slidably cooperates with the first recess 50 for permitting loading and unloading of the first bearing 48 within the first recess 50 in a first direction as indicated by the arrow 84 which is disposed parallel to the rotational axis 28 of the control shaft 14.

Additionally, the second bearing 52 encircles the second extremity 38 of the worm 34, the second bearing 52 defining an external configuration which slidably cooperates with the second recess 54 for permitting loading and unloading of the second bearing 52 within the second recess 54 in a second direction as indicated by the arrow 86 which is also disposed parallel to the rotational axis 28 of the control shaft 14.

Also, the cover 56 defines a further cavity 88 for the rotatable reception therein of the second side 26 of the gearbox wheel 22 as shown in FIG. 1, so that when the cover 56 together with the worm 34 rotatably supported by the bearings 48 and 52 is aligned with the housing 44 such that the bearings 48 and 52 slide within the respective recesses 50 and 54, the second side 26 of the gearbox wheel 22 is received within the further cavity 88 so that the cavities 82 and 88 bearingly support the gearbox wheel 22 for rotation thereof within the enclosure 46.

Moreover, the multi-turn power drive 60 is an electric multi-turn power drive. However, it will be understood by those skilled in the art that the multi-turn power drive 60 could be an electric, hydraulic, pneumatic or gas motor or any other type of powered motor.

In operation of the apparatus according to the present invention, the valve actuator is assembled by securing the second end 18 of the shaft 14 within the elongate channel 66 of the gearbox wheel 22 and the cover 56 with the worm 34 and bearings 48 and 52 assembled therein is moved in the direction of the arrows 84 and 86 as shown in FIG. 2 so that the bearings 48 and 52 slide into the recesses 50 and 54 respectively of the housing 44 so that the worm 34 is correctly and accurately located in mesh with the gearbox wheel 22. The multi-turn power drive 60 is then secured to the flange 58 for driving the first extremity 36 of the worm 34.

In certain applications, a stepdown gearbox can be interposed between the multi-turn power drive 60 and the worm 34 so that the torque applied to the shaft 14 is increased.

The present invention provides a unique valve actuator that is easily assembled and which is driven by a multi-turn power drive for permitting remote control of the valve actuator.

What is claimed is:

1. An apparatus for actuating a valve, said apparatus comprising:

a rotatable control shaft having a first and a second end, said first end of said control shaft being connected to the valve such that when said shaft is rotated, the valve is moved between an open and a closed disposition thereof;

a gearbox wheel having a first and a second side, said wheel being secured to said second end of said control shaft such that when said gearbox wheel rotates about a rotational axis of said control shaft, said control shaft is rotated for moving the valve between said open and said closed disposition thereof;

said gearbox wheel defining a plurality of gearteeth disposed around a portion of a periphery of said wheel;

a worm having a first and a second extremity, said worm having an axis of rotation which is disposed angularly relative to said rotational axis of said control shaft, said worm intermeshing with said gearteeth of said gearbox wheel such that when said worm is rotated, said wheel and said shaft are rotated for moving the valve between said open and said closed disposition thereof;

a housing defining an enclosure for the reception therein of said gearbox wheel and said intermeshing worm;

a first bearing for rotatably supporting said first extremity of said worm, said first bearing being slidably received in a first direction which is disposed parallel to said rotational axis within a first recess defined by said housing;

a second bearing for rotatably supporting said second extremity of said worm, said second bearing being slidably received in a second direction which is disposed parallel to said rotational axis within a second recess defined by said housing, said bearings and said recesses being structured such that when said first and said second extremities of said worm extend respectively through said first and said second bearings, said bearings are slidably disposed in said first and second directions respectively within said first and second recess so that location of said worm into intermeshing relationship with said gearteeth is facilitated;

a cover secured to said housing for sealing said enclosure and for retaining said gearbox wheel and intermeshing worm within said enclosure, said cover defining a flange which extends radially from said axis of rotation of said worm so that said first extremity of said worm extends through said flange; and a multi-turn power drive secured to said flange and drivingly connected to said first extremity of said worm for rotating said worm so that the valve is controllably moved between said open and said closed disposition thereof.

2. An apparatus for actuating a valve as set forth in claim 1 wherein said second end of said control shaft extends through said housing and said gearbox wheel, said control shaft being coaxial relative to said gearbox wheel, said second end of said control shaft defining an axial slot.

3. An apparatus for actuating a valve as set forth in claim 2 wherein said gearbox wheel defines an elongate channel for the reception therein of said second end of said control shaft, said elongate channel having an axial groove;

said gearbox wheel including:

a key which cooperates with said axial slot of said control shaft and said axial groove of said elongate channel such that said gearbox wheel and said second end of said shaft are removably secured relative to each other so that rotation of said wheel about said rotational axis of said control shaft rotates said control shaft for moving the valve between said open and said closed disposition thereof.

4. An apparatus for actuating a valve as set forth in claim 1 wherein said gearbox wheel includes:

a sector having a first and a second termination, said sector extending radially from said rotational axis of said control shaft, said sector defining said portion of said periphery of said wheel such that said portion extends approximately through 90 degrees around said periphery of said wheel.

5. An apparatus for actuating a valve as set forth in claim 4 wherein said gearbox wheel includes:

an adjustable stop extending through said housing, said stop reacting with said first termination of said sector for limiting rotation of said wheel within said housing.

6. An apparatus for actuating a valve as set forth in claim 4 wherein said sector defines said plurality of gearteeth, said gearteeth extending substantially coaxially relative to said rotational axis of said control shaft.

7. An apparatus for actuating a valve as set forth in claim 1 wherein said axis of rotation of said worm is disposed substantially normal to said rotational axis of said control shaft.

8. An apparatus for actuating a valve as set forth in claim 1 wherein said worm intermeshes with said gearteeth of said wheel between said first and second extremities of said worm.

9. An apparatus for actuating a valve as set forth in claim 1 wherein said worm defines a worm gear of generally spiral configuration such that when said worm gear intermeshes with said gearteeth of said wheel, rotation of said worm gear about said axis of rotation of said worm rotates said gearbox wheel about said rotational axis of said control shaft.

10. An apparatus for actuating a valve as set forth in claim 1 wherein said housing is a one piece casting, said housing defining a cavity for the rotatable reception therein of said first side of said gearbox wheel so that rotation of said gearbox wheel within said enclosure about said rotational axis of said shaft is permitted.

11. An apparatus for actuating a valve as set forth in claim 1 wherein said first bearing encircles said first extremity of said worm, said first bearing defining an external shape which slidably cooperates with said first recess for permitting loading and unloading of said first bearing within said first recess in a said first direction which is disposed parallel to said rotational axis of said control shaft;

said second bearing encircles said second extremity of said worm, said second bearing defining an external configuration which slidably cooperates with said second recess for permitting loading and unloading of said second bearing within said second recess in a said second direction which is disposed parallel to said rotational axis of said control shaft.

12. An apparatus for actuating a valve as set forth in claim 10 wherein said cover defines a further cavity for the rotatable reception therein of said second side of said gearbox wheel so that when said cover together with said worm rotatably supported by said bearings is aligned with said housing, said bearings slide within said respective recesses such that said second side of said gearbox wheel is received within said further cavity so that said cavities bearingly support said gearbox wheel for rotation thereof within said enclosure.

13. An apparatus for actuating a valve as set forth in claim 1 wherein said multi-turn power drive is an electric multi-turn power drive.

14. An apparatus for actuating a valve, said apparatus comprising:

a rotatable control shaft having a first and a second end, said first end of said control shaft being connected to the valve such that when said shaft is rotated, the valve is moved between an open and a closed disposition thereof;

a gearbox wheel having a first and a second side, said wheel being secured to said second end of said control shaft such that when said gearbox wheel rotates about a rotational axis of said control shaft, said control shaft is rotated for moving the valve between said open and said closed disposition thereof;

said gearbox wheel defining a plurality of gearteeth disposed around a portion of a periphery of said wheel;

a worm having a first and a second extremity, said worm having an axis of rotation which is disposed angularly relative to said rotational axis of said control shaft, said worm intermeshing with said gearteeth of said gearbox wheel such that when said worm is rotated, said wheel and said shaft are rotated for moving the valve between said open and said closed disposition thereof;

a housing defining an enclosure for the reception therein of said gearbox wheel and said intermeshing worm;

a first bearing for rotatably supporting said first extremity of said worm, said first bearing being slidably received in a first direction which is disposed parallel to said rotational axis within a first recess defined by said housing;

a second bearing for rotatably supporting said second extremity of said worm, said second bearing being slidably received in a second direction which is disposed parallel to said rotational axis within a second recess defined by said housing, said bearings and said recesses being structured such that when said first and said second extremities of said worm extend respectively through said first and said second bearings, said bearings are slidably disposed in said first and second directions respectively within said first and second recess so that location of said worm into intermeshing relationship with said gearteeth is facilitated;

a cover secured to said housing for sealing said enclosure and for retaining said gearbox wheel and intermeshing worm within said enclosure, said cover defining a flange which extends radially from said axis of rotation of said worm so that said first extremity of said worm extends through said flange;

a multi-turn power drive secured to said flange and drivingly connected to said first extremity of said worm for rotating said worm so that the valve is controllably moved between said open and said closed disposition thereof;

said first bearing supports said first extremity of said worm, said first bearing defining an external shape which slidably cooperates with said first recess for permitting loading and unloading of said first bearing within said first recess in a first direction which is disposed parallel to said rotational axis of said control shaft; and said second bearing supports said second extremity of said worm, said second bearing defining an external configuration which slidably cooperates with said second recess for permitting loading and unloading of said second bearing within said second recess in a second direction which is disposed parallel to said rotational axis of said control shaft.

15. An apparatus for actuating a valve, said apparatus comprising:

a rotatable control shaft having a first and a second end, said first end of said control shaft being connected to the valve such that when said shaft is rotated, the valve is moved between an open and a closed disposition thereof;

a gearbox wheel having a first and a second side, said wheel being secured to said second end of said control shaft such that when said gearbox wheel rotates about a rotational axis of said control shaft, said control shaft is rotated for moving the valve between said open and said closed disposition thereof;

said gearbox wheel defining a plurality of gearteeth disposed around a portion of a periphery of said wheel;

a worm having a first and a second extremity, said worm having an axis of rotation which is disposed angularly relative to said rotational axis of said control shaft, said worm intermeshing with said gearteeth of said gearbox wheel such that when said worm is rotated, said wheel and said shaft are rotated for moving the valve between said open and said closed disposition thereof;

a housing defining an enclosure for the reception therein of said gearbox wheel and said intermeshing worm;

a first bearing for rotatably supporting said first extremity of said worm, said first bearing being slidably received in a first direction which is disposed parallel to said rotational axis within a first recess defined by said housing;

a second bearing for rotatably supporting said second extremity of said worm, said second bearing being slidably received in a second direction which is disposed parallel to said rotational axis within a second recess defined by said housing, said bearings and said recesses being structured such that when said first and said second extremities of said worm extend respectively through said first and said second bearings, said bearings are slidably disposed in said first and second directions respectively within said first and second recess so that location of said worm into intermeshing relationship with said gearteeth is facilitated;

a cover secured to said housing for sealing said enclosure and for retaining said gearbox wheel and intermeshing worm within said enclosure, said cover defining a flange which extends radially from said axis of rotation of said worm so that said first extremity of said worm extends through said flange;

a multi-turn power drive secured to said flange and drivingly connected to said first extremity of said worm for rotating said worm so that the valve is controllably moved between said open and said closed disposition thereof;

said second end of said control shaft extends through said housing and said gearbox wheel, said control shaft being coaxial relative to said gearbox wheel, second end of said control shall defining an axial slot;

said gearbox wheel defines an elongate channel for the reception therein of said second end of said control shaft, said elongate channel having an axial groove;

said gearbox wheel including:

a key which cooperates with said axial slot of said control shaft and said axial groove of said elongate channel such that said gearbox wheel and said second end of said shaft are removably secured relative to each other so that rotation of said wheel about said rotational axis of said control shaft rotates said control shaft for moving the valve between said open and said closed disposition thereof;

said gearbox wheel further including:

a sector having a first and a second termination, said sector extending radially from said rotational axis of said control shaft, said sector defining said portion of said periphery of said wheel such that said portion extends approximately through 90 degrees around said periphery of said wheel;

an adjustable stop extending through said housing, said stop reacting with said first termination of said sector for limiting rotation of said wheel within said housing;

said sector defines said plurality of gearteeth, said gearteeth extending substantially coaxially relative to said rotational axis of said control shaft;

said axis of rotation of said worm is disposed substantially normal to said rotational axis of said control shaft;

said worm intermeshes with said gearteeth of said wheel between said first and second extremities of said worm;

said worm defines a worm gear of generally spiral configuration such that when said worm gear intermeshes with said gearteeth of said wheel, rotation of said worm gear about said axis of rotation of said worm rotates said gearbox wheel about said rotational axis of said control shaft;

said housing is a one piece casting, said housing defining a cavity for the rotatable reception therein of said first side of said gearbox wheel so that rotation of said gearbox wheel within said enclosure about said rotational axis of said shaft is permitted;

said first bearing encircles said first extremity of said worm, said first bearing defining an external shape which slidably cooperates with said first recess for permitting loading and unloading of said first bearing within said first recess in a first direction which is disposed parallel to said rotational axis of said control shaft;

said second bearing encircles said second extremity of said worm, said second bearing defining an external configuration which slidably cooperates with said second recess for permitting loading and unloading of said second bearing within said second recess in a second direction which is disposed parallel to said rotational axis of said control shaft;

said cover defines a further cavity for the rotatable reception therein of said second side of said gearbox wheel so that when said cover together with said worm rotatably supported by said bearings is aligned with said housing such that said bearings slide within said respective recesses, said second side of said gearbox wheel is received within said further cavity so that said cavities bearingly support said gearbox wheel for rotation thereof within said enclosure; and said multi-turn power drive is an electric multi-turn power drive.

* * * * *